3,411,888
AGGLOMERATION OF NATURALLY
OCCURRING ZEOLITES
Emery H. Westerland, Tonawanda, and Wilfred Drost, Williamsville, N.Y., assignors to Union Carbide Corporation, a corporation of New York
No Drawing. Continuation-in-part of application Ser. No. 191,229, Apr. 30, 1962. This application Nov. 30, 1965, Ser. No. 510,675
3 Claims. (Cl. 23—313)

ABSTRACT OF THE DISCLOSURE

The invention relates to a process for forming agglomerate particles of naturally-occurring zeolite ores. It has been found that these ores contain relatively small quantities of gangue materials of indefinite composition which if properly treated act as very good binder material for the zeolite crystals. Essential factors in the process are (a) particle size of the ore mass, less than 100 mesh, (b) the quantity of water added to the ore, between 35 to 45 weight percent of the total composition, (c) the firing temperature, from 375° C. to 700° C., and (d) the use of an inert purge gas during the firing.

---

This application is a continuation-in-part of copending application Ser. No. 191,229 filed Apr. 30, 1962, now abandoned.

The present invention relates to natural zeolite agglomerates prepared without the use of binder additions.

Zeolites in general are hydrated metal aluminosilicates having a generic chemical formula expressed as oxides as follows:

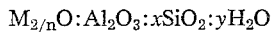
$$M_{2/n}O:Al_2O_3:xSiO_2:yH_2O$$

wherein M represents a cationic metal constituent and $n$ is its valence. In general, a particular zeolite will have values for $x$ and $y$ that fall within a definite range. Many of these zeolites take the physical form of three-dimensional crystalline structures comprising cavities interconnected by pores of uniform size. In the hydrated form the cavities of the zeolites are filled with water. Dehydration, or as it is commonly called, activation, consists of heating the hydrated form of zeolite to elevated temperature thereby purging the cavities of water and transforming the zeolite into a molecular sieve. In the dehydrated form, the cavity-pore system of the zeolites can be utilized to effectively and efficiently perform a variety of functions including separation of fluid molecular species, catalysis and the like.

Until recently many of the naturally occurring zeolites were thought to occur in quantities so minute and impure as to be of little commercial use. Accordingly, to overcome this deficiency in the quantity and quality of natural zeolites, various species of synthetic zeolites have recently been prepared in high purity and large quantity for commercial use.

Synthetic zeolites are generally prepared in fine particulate form commonly less than about 30 microns in size. Powders comprising crystals of this size, while possessing utility in some areas, are generally not very satisfactory for use in separation processes employing fixed beds. Due to the extremely fine particle size of the crystals, the powders compact to such an extent as to render the zeolite bed practically impervious. For the various fluid contact systems, high pressure is required to force both liquid and gas molecules through the practically impervious dehydrated zeolite bed. In addition, in processes requiring fluid flow through a bed in the direction opposite to the force of gravity, the use of fine particulate zeolite powder leads to fluidization in gas separation processes and the production of zeolite suspensions or slaking in liquid systems.

To circumvent these limitations it has been necessary to agglomerate the zeolites into masses having the desired density and size commensurate with the particular condition under which the zeolites are used. The desirable density prevents fluidization and production of suspensions. The proper agglomerate size contributes to interagglomerate porosity and as a consequence the pressure drop required to force the fluid molecular species through a given bed for fluid separation is substantially decreased.

Agglomeration, of course, leads to other difficulties. In general, agglomeration of zeolites is accomplished by the addition of water and a binder to the zeolites followed by treatment at elevated temperatures to achieve agglomeration. It is known that zeolites possess a high degree of dilatancy. In view of the dilatant tendencies of zeolites, the addition of a binder material was thought to be required to permit an artisan to produce a coherent mass, by pressurization, which would not revert to a free flowing liquid or suspension upon release of the pressure. Heretofore, it has been thought that bonding of particulate, natural zeolites would also require the use of an added binder material. This, of course, causes a reduction in the amount of effective adsorbent per agglomerate. While such agglomeration methods do not detrimentally reduce the amount of effective adsorbent (i.e. zeolite) in the highly pure synthetically prepared zeolites, when impure natural zeolites are employed, the addition of binder material could detrimentally dilute the amount of effective adsorbent in the agglomerate or at least substantially reduce the amount of effective adsorbent per agglomerate.

Recently, deposits of relatively pure natural zeolites have been discovered in sufficient quantity to provide a source for use in commercial processes. In general, natural zeolite minerals occur in sedimentary rocks as alteration or devitrification products of water-laid volcanic tuffs, usually of Tertiary or early Pleistocene age. Wind blown volcanic ash particles, abundant relics of which are still preserved, are presumed to have fallen into the many intermountain lakes common in the western states at that time and have formed lacustrine tuff deposits. Sometime after burial the volcanic ash was probably altered or devitrified by the action of alkaline lake and/or ground waters and transformed into siliceous zeolite materials. Zeolite beds are commonly admixed with quantities of quartz, feldspar, and unaltered ash and the presence of two or more different zeolites in the same bed is not unusual. These natural zeolites as is stated above contain various impurities which cannot be separated from the zeolite material, if separation is possible at all. The use of natural zeolites as adsorbents does not generally permit the addition of binder materials without greatly reducing the adsorptive capacity of the already impure materials. The natural zeolites include erionite, phillipsite, chabazite, mordenite and clinoptilolite.

Identification of particular species of natural zeolites is accomplished by X-ray diffraction techniques. The crystal structure and X-ray diffraction patterns of the natural zeolites are secured and compared with known X-ray patterns of these minerals.

Generally 3 to 8 or 10 major lines are sufficient to enable a skilled artisan to identify the particular species present. Slight shifts in the positions and intensities of various lines do not pose a problem to the skilled crystallographer.

The zeolite content (purity) of a mineral specimen is determined by dividing its oxygen adsorption capacity by the oxygen adsorption capacity of a highly pure zeolite at 100 mm. Hg oxygen pressure at −183° C. The oxygen capacity is determined on a gravimetric adsorption balance of the McBain-Baker type. The standard oxygen capacities of three of the highly pure natural zeolites of most importance and abundance are 25.2 grams/100 grams of activated chabazite, 20.6 grams/100 grams of activated erionite and 13.7 grams/100 grams of activated mordenite. In the case of phillipsite, the adsorption pore size is such that oxygen is not adsorbed at an appreciable rate at this temperature and pressure. With clinoptilolite which has a similar small pore size, the oxygen-adsorbing properties seem to vary with locality. For these two zeolites, a $CO_2$ adsorption capacity at 250 mm. Hg pressure and room temperature can be used.

The adsorption capacity is an intrinsic property of the crystal structure of the zeolite phase and as such an adsorption analysis represents the most reliable method for determining zeolite content. Under the adsorbate conditions chosen, the capacity is independent of variations in particle properties. The accuracy of the adsorption method with oxygen is ±5%, and is a function of the accuracy of the adsorption measurement.

Natural zeolites occur in large beds and are removed from the deposits as large chunks of material. This virgin material, as removed, has little use in adsorption processes for many reasons. The particle size ranges from large chunks to fines less than 325 mesh in size. Any attempt to use these heterogeneous virgin materials, as removed from the natural deposits, would be unsuccessful since pressure drops across various sections of large adsorption beds would vary erratically. The large chunks, though they could be reduced in size, are too low in density and possess such a high attrition loss that they are not amenable for use to any great extent on a commercial basis, especially in moving beds. Firing of the friable, low density natural forms will not increase the density and the attrition resistance and crush strength are not enhanced to the point where they are considered amenable for use in commercial processes.

It is the main object of the present invention to provide a natural zeolite agglomerate, free of added binder, and having high density, high attrition resistance and high crush strength.

Further objects of the present invention include a zeolite agglomerate possessing substantially the adsorptive capacity of the natural zeolites, undiluted by added binder material. A still further object is to provide a process for preparing such naturally occurring zeolite agglomerates.

The present invention includes an agglomerate consisting essentially of naturally-occurring zeolite ore, essentially being free of added binder materials, and possessing high crush strength, attrition resistance and having a density substantially higher than the virgin naturally-occurring zeolite ore.

The present invention further includes a process for preparation of an agglomerate consisting essentially of naturally-occurring zeolite ore, essentially being free of added binder materials, comprising comminution of the naturally-occurring zeolite ore to a particle size less than about 100 mesh (U.S. Standard Sieve) and mixing the comminuted ore to form a substantially homogeneous mixture of the zeolite ore; thereafter mixing sufficient water with the homogeneous mixture to produce a pliant mass; forming the pliant mass into an intermediate coherent form by application of pressure thereto and/or by rolling techniques and firing the intermediate coherent form at an elevated temperature of greater than about 375° C. while being purged with a gas stream inert to the zeolite, the rate of purge being at least about 25 cubic feet per hour per pound of hydrated zeolite agglomerate per hour of firing. The product is a dense agglomerate having a crush strength of greater than about 5 pounds by a Radial Crush Test and having high attrition resistance.

For purposes of the present invention the comminuting of the zeolite ore to particle sizes less than about 100 mesh can conveniently be accomplished by a variety of well-known methods including ball milling, rod milling, and hammer milling. As a further alternative, comminution may be effected by passing the ore over a vibration screen since the natural ore is very friable. Comminution is desirably accomplished when the zeolites are substantially dry except for any water of hydration which is present. Although wet grinding may be used if desired, dry grinding is preferred because it is more efficient. Water causes the material to become mudlike and subsequent handling is difficult.

The comminuted ore must be mixed to a substantially homogeneous mass at least prior to forming into a coherent mass by application pressure and/or extrusion or rolling techniques. Mixing may be accomplished during comminution or thereafter. At any rate the comminuted ore must be transformed into a substantially homogeneous mixture prior to forming into a coherent mass to realize the aforementioned physical characteristics in the final agglomerate. The reason for the necessity of forming a homogeneous mixture has not been completely established. The naturally occurring zeolite ores exist as a rather friable mass, which cannot be transformed into a highly attrition resistant agglomerate having a high crush strength without first rendering the comminuted mass of ore substantially homogeneous. It should further be understood that the zeolite ore occurs as loosely held agglomerates of crystalline zeolites heterogeneously interspersed with gangue materials.

At first impression it may appear that since the friable ore can easily be reduced to a small particle size, it is obvious that the next step in producing an agglomerate need only be the forming step. It has been found that this is not the case. To the contrary, it has been discovered that prior to forming, the natural ore must be transformed into a homogeneous mixture to produce a final agglomerate having high attrition resistance and crush strength.

It has been found that when comminuted ore having a surface area greater than about 10 square meters per gram is utilized in the present process, substantial crush resistance in the final agglomerate as well as substantial attrition resistance and controllable density after compaction or extrusion and firing as achieved. The Brunnauer-Emmet-Teller technique utilizing a gas which is not internally adsorbed by the hydrated form of the zeolite is a convenient method of measuring surface area.

The average particle-diameter of a particle in a mixture having an external surface area of greater than about 10 square meters per gram, as determined by the Brunnauer-Emmet-Teller method, can be conveniently calculated by assuming a spherical form and an average density of about 2 grams per cc. in the comminuted zeolite ore. A formula for such conversion is disclosed in "Physical Methods in Chemical Analysis"—Berl, Vol. II, p. 278.

It should be noted at the outset that one of the objects of the present invention is to provide agglomerates of natural zeolites having a crush strength which will render them amenable for use in commercial processes. The agglomerates accordingly must have a crush strength of greater than about 5 pounds as determined by a Radial Crush Test.

The apparatus used for this test is a modified spring tester on which the pellet is compressed against an anvil located on a spring-supported platen by a second movable platen. The crushing load, in pounds, is indicated directly on a dial scale built into the tester. The pellets are crushed on a diameter across a narrow anvil so that the length of the pellet crushed is constant. Pellets ⅛-inch diameter are crushed on a ¼-inch wide anvil; pellets 1/16-inch diameter are crushed on a ⅛-inch wide anvil. The anvil is supported on rollers on its platen to prevent any lateral or rolling motion from being imparted to the pellet.

Rendering the crushed materials into a coherent pliable intermediate mass prior to forming the final desired shape is accomplished by addition of water thereto in the proper amounts.

Any one of a number of techniques may be utilized to form various shapes from the pliable coherent intermediate mixture. For example, semi-spherical beads may be made by rolling the intermediate mixture on the inner surface of a rotating drum or cylinder, pellets may be made by well known tableting techniques or the intermediate material may be extruded.

The proper water content in the intermediate material prior to forming the same into the final shape is determined to a large extent by the means to be utilized in forming the final shape. In extrusion forming, the water content of the mixture is quite critical. It has been found that a water content in the mix of approximately 35 and 45 weight percent, including that water required to fully hydrate the zeolites, is the optimum water content. This water content enables an artisan to achieve continuous extrusion of the intermediate mix. Water contents less than this amount in extrusion mixtures results in only intermittent and erratic extrusion with the extrudate not being continuous and free flowing from the die. Water contents in excess of the aforementioned amount render the extrudate too watery to retain a coherent form.

Extrusion aids or lubricants can to some extent alleviate the detrimental effect of employing water in amounts below that prescribed above. Such extrusion aids as glycerine and sodium lignosulfonates may be employed to aid in extrusion. The use of an extrusion aid, though possessing some advantage, will not render the intermediate mixture continuously extrudable in water contents widely varying from that range aforementioned. Such extrusion aids are normally volatilized during firing but at any rate are not considered added binder material in the present invention nor do they act as a binder.

In the prior art, the firing temperature is largely dictated by the type of added binder material. That is, the firing temperature is preferably above the temperature of a phase transformation if a clay mineral binder is added to a zeolite mixture prior to firing. In the present invention, the firing temperature is not dictated by the type of added binder added since no added binder is employed. Nor has it been found that a dense, attrition resistant strong agglomerate can be produced by varying the firing temperature alone. Rather it has been found that crush strength, attrition resistance and density in the final product is dependent upon employing the combination of steps as thereinbefore disclosed in conjunction with firing at a temperature greater than about 375° C. using an inert gas purge. The upper limit of the firing temperature is the temperature at which the three-dimensional crystallinity of the zeolite is destroyed, i.e. about 700° C. Activation or dehydration of the final agglomerate to remove the internal water of crystallization from the zeolites may be performed simultaneously with firing of the coherent green agglomerate or it may be performed as an independent process step after the coherent green forms are fired to produce the final partially hydrated agglomerate.

It has been found that during activation or dehydration i.e. firing of the agglomerate product it is a critical factor that a purge gas be employed. Insufficient quantities of purging atmosphere results either in deterioration of effective zeolite content or in rendering a portion of the zeolite content unavailable for adsorption service. Since zeolite ores infrequently contain more than about 80 per cent zeolite it is essential that as little loss of effective zeolite content as possible be permitted during preparation of the final agglomerate products. Whereas the necessity for using a purge gas is critical, the quantity of purge gas is not narrowly critical, but rather depends in large measure upon whether the agglomerate particles are being dried in an unagitated or static bed or under dynamic conditions such as a rotary kiln. The dynamic conditions are much preferred and require quantities of purge gas in an amount of at least about 25 cu. ft. per hour per pound of agglomerate being fired per hour of firing period. A rate of about 100 cu. ft. of purge gas is preferred, but higher rates, i.e. up to about 300 cu. ft. can be employed. Under static conditions, i.e. using a relatively shallow bed of hydrated agglomerate, about 1 to 1¼ inch deep, in ovens or stationary kilns, a purge gas flow rate of about 200 cu ft./hour or more per pound of charge per hour is usually preferred. Static firing methods are usually confined to relatively small charges.

The purge gas can be any which is stable at the firing temperatures and which does not to any appreciable extent react with or deteriorate the zeolite. Air and nitrogen or mixtures thereof are preferred.

To demonstrate the essential nature of the use of a purge gas, a batch of naturally-occurring zeolite ore containing chabazite, erionite and clinoptilolite was shaped into ⅛-in. extrusions by the method of the invention. One portion of the partly dried batch was charged to a small rotary kiln, which was then closed off, i.e., no purge gas was admitted, during the activatoin period of 20 min. at 625° C. Adsorption analysis of the fired product showed a zeolite content of 67%. Next, as a comparison run, an equal quantity from the original batch of extrudate was fired for 20 min. in this kiln, using a purge gas (air) flowing therethrough at the rate of 25 cfh. per lb. of hydrated charge per hour. Thereafter, the activated product of this run was analyzed by adsorption methods and found to contain 70–71% active zeolite. Similarly, for a purge gas flowing at the rate of 100 cfh. per lb. per hour, the activated product analyzed 72% effective zeolite content. On larger scale installations, flow rates of 100 c.f.h./lb./hr. or higher may be used. For zeolite ores of higher zeolite contents, comparable retention of the effective zeolite content by use of adequate purge rates is realized.

In a typical procedure of this invention, 5000 pounds of a natural virgin zeolite ore containing about 85 weight per cent of chabazite, erionite and clinoptilolite were dry crushed to less than about 100 (U.S. Standard Sieve) and mixed to produce a homogeneous mass. Water was added to the homogeneous, crushed virgin ore until the total water content including the amount required to hydrate the natural zeolites was about 40 weight percent. The total mixture was extruded to produce approximately a total of 5000 pounds of ¹⁄₁₆ and ⅛ inch pellets. The pellets were dried in a rotary dryer at about 125° C. until the water content of the mixture was reduced to about 15 weight percent including the water of hydration of the Zeolites. The pellets were then fired at about 600° C. using an air purge of about 100 cu. ft. per hour per pound of charge to produce the finished product. The finished product is much more attrition resistant and has a higher density than the natural ore. In addition the crush strength of the final product was well above that of the friable virgin ore.

The process of the present invention is amenable for use in producing useful agglomerates free of added binder materials directly from other virgin ores such as those primarily containing mordenite, erionite or chabazite alone. In addition, ores containing clinoptilolite and phillipsite are also amenable for treatment in the present process.

It is further contemplated that the present invention is amenable for use on natural ores containing greater than about 60 weight percent zeolites.

In addition to the fact that the present invention provides a novel process and agglomerate several other advantages are achieved by the present invention. Heretofore, it has been known that some synthetic zeolites are unstable upon exposure to acid atmospheres or environments and agglomerates containing zeolites lose, to a substantial extent, their crush resistance after exposure to acid atmospheres or environments. It has been found that the agglomerates of the present invention are substantially more resistant to acid environments and that the agglomerates of the present invention substantially retain their crush strength after exposure to acid environments.

To illustrate the acid stability of the agglomerates of the present invention, Hcl gas presaturated with 0.3 volume percent of water was passed through a weighed bed of dehydrated agglomerates prepared from a chabazite-erionite-clinoptilolite ore containing about 67 total weight percent of these zeolites. The bed was exposed to the HCl containing environment until the bed adsorbed an equilibrium quantity of HCl. The bed was then weighed and the HCl was removed from the agglomerates by heating the bed material to about 600–650° F. while purging with dry nitrogen for 30 minutes and after such removal the bed was again weighed. In this manner the amount of HCl adsorbed and desorbed by the bed was determined. The agglomerates of the present invention were treated three times in succession in the aforementioned manner. The results of this experiment are shown below:

| | Percent HCl |
|---|---|
| 1st adsorption | 14.0 |
| 1st desorption | 3.0 |
| 2nd adsorption | 13.0 |
| 2nd desorption | 3.6 |
| 3rd adsorption | 13.8 |
| 3rd desorption | 6.0 |

X-ray diffraction patterns obtained by X-ray analysis of the agglomerates indicated virtually no loss of crystallinity during the cyclic treatment of the agglomerates in an HCl environment. A similar test performed on synthetic zeolite agglomerates of the type commonly designated as calcium A zeolites prepared with an added clay mineral binder showed virtually complete destruction of the crystallinity of the zeolite.

The agglomerates of the present invention, after treatment in an HCl environment as hereinbefore described, were then exposed to water to determine their water capacity after being subjected to an acid environment. The agglomerates were heated in a muffle furnace for 1.5 hours at 932° F. in a nitrogen purge stream to completely dehydrate the acid treated agglomerates. The agglomerates were then placed in a container with water under a pressure of approximately 24 mm. and permitted to remain under such conditions for about 18 hours. The water adsorbed by the acid treated pellets was 44.5 grams per 100 grams of agglomerate. The agglomerates prior to acid-treatment had a water adsorption capacity of only 28.0 grams per 100 grams of agglomerate. Unexpectedly the water capacity of the acid treated agglomerates increased substantially after exposure to an acid environment. In sharp contrast, an agglomerate prepared from synthetic zeolites of the calcium A type utilizing an added clay binder would show a substantial decrease in water capacity after exposure to an acid environment due to a loss in crystallinity as aforementioned. It may be preferable in some instances, where high water capacity is desirable, to pre-treat the agglomerates of the present invention by exposure to an acid environment to increase their water adsorption capacity.

Heretofore, it has been found that the crush strength of synthetic zeolite agglomerates prepared utilizing a clay binder is detrimentally affected by exposure to an acid environment. This fact is especially prevalent when type A zeolites are utilized. The crush strength of the agglomerates of the present invention is not substantially affected by exposure to an acid environment.

The remarkable results in improved crush strength and density of the products of this invention obtained by using ore which has been crushed to a particle size less than about 100 mesh is demonstrated by the following comparison. A sample of zeolite ore containing a mixture of chabazite, erionite and clinoptilolite was comminuted and separated into two fractions—one containing 100 mesh particles and the other containing 50×100 mesh particles. Both fractions were processed in an identical manner in accordance with the process steps of this invention, extruded and purge-fired. The pellet formed from the 100 mesh particles was found to have a piece crush strength (lb.) of 51 and a piece density of 78 lb./cu. ft. The comparison pellets had a piece crush strength of only 39 and a density of only 73.

What is claimed is:

1. A process for preparation of an agglomerate consisting essentially of naturally-occurring zeolite ore essentially free of added binder materials, comprising comminuting the virgin naturally-occurring zeolite ore to a particle size less than about 100 mesh (U.S. Standard Sieve) and mixing the comminuted ore to produce a substantially homogeneous composition of the zeolite ore; thereafter mixing sufficient water with the homogeneous composition to form a pliant mass; forming the pliant mass into an intermediate coherent agglomerate; and firing the intermediate coherent agglomerate at elevated temperatures greater than about 375° C. and up to a temperature of about 700° C. while purging same with at least 25 cubic feet per hour per pound of said hydrated agglomerate of a purge gas substantially inert to the zeolite component thereof.

2. A process in accordance with claim 1 wherein said forming is accomplished by extrusion and said water is added to said composition of comminuted ore until the total water content of the composition, including the water required to fully hydrate the zeolite, is between about 35 and about 45 weight percent of the total composition, the purge gas is air or nitrogen and is employed at a purge rate of about 100 cubic feet per hour per pound of hydrated agglomerate.

3. A process in accordance with claim 2 wherein the moisture content of said intermediate coherent form is reduced to about 15 weight percent including the water of hydration prior to firing by heating said intermediate coherent form at a temperature ranging from about 100° C. to about 150° C.

References Cited

UNITED STATES PATENTS

| 3,130,007 | 4/1964 | Breck. | |
| 3,142,862 | 8/1964 | Guldman | 23—313 |
| 3,323,876 | 6/1967 | Arey | 23—313 |
| 3,329,627 | 7/1967 | Gladrow | 23—182 |

NORMAN YUDKOFF, *Primary Examiner.*

G. P. HINES, *Assistant Examiner.*